3,272,777
METHOD FOR POLYMERIZING ALDEHYDES
Shinichi Ishida, Itabashi-ku, Tokyo, Japan, assignor to
   Asahi Kasei Kagyo Kabushiki Kaisha, Osaka, Japan, a
   corporation of Japan
No Drawing. Filed Apr. 18, 1961, Ser. No. 103,711
Claims priority, application Japan, Apr. 26, 1960,
   35/22,104; Nov. 2, 1960, 35/44,091; Nov. 10,
   1960, 35/44,352, 35/44,353
10 Claims. (Cl. 260—67)

The present invention is concerned with a novel method for polymerizing aldehydes, particularly aliphatic aldehydes.

Polymerization of acetaldehyde, as well as some higher aldehydes, has been reported by M. Letort, and M. W. Travers et al. Also, J. Furukawa et al. has recently discovered that polymerization of aldehydes is started on the surface of alumina. (Cf. Makromol. Chem. 1959, 33, 32.)

These polymerizations give rise to a pollyaddition reaction through cleavage of the aldehyde radical, and the product contains a polyether structure in the molecule. Generally speaking, there may be three kinds of isomeric structures of the product with regard to the stereo-structural meaning, but the polyaldehydes heretofore known are amorphous materials which are considered to be one kind of them having an irregular structure. All of these polyaldehydes are soft and waxy, and unsuitable for shaping material.

An object of the present invention is to provide a method for producing a crystalline polyether having a regular structure which also is one kind of said three isomeric structures, with commercial advantages.

The amorphous polyaldehydes heretofore known are rubber-like, elastomeric, and unstable against heat, and tend to gradually depolymerize even when being left in the air, therefore they hardly endure the subsequent treatments and processes, and are far from the practical utilization as shaping material.

As opposed to this, the polymerized product produced according to the present invention is a non-adhesive, normally solid, and plastic material having a higher degree of crystallinity, and has an exceedingly larger stability against ageing as well as heat, than that of the amorphous polyaldehyde. Further, it endures the processes, and has a potential utility as materials for manufacturing shaped articles, such as film, fiber, pipe, rod, and the like.

According to the present invention, a method for producing polyaldehyde containing at least some amount of crystalline part and having polyether structure in the molecule, is provided, which method comprises polymerizing an aldehyde having 2 to 10 carbon atoms, such as alkyl-, cycloalkyl-, arylalkyl-, halogenated alkyl-, halogenated cycloalkyl-, and heterocyclic aldehydes, at a temperature as low as −30° C. to −120° C. in the presence of a solvent, using an organometallic compound of metals belonging to III group of the Periodic Table.

The present invention may be more effectively carried out by first contacting or mixing the aldehyde with the catalyst at room temperature, or at a temperature below room temperature, but above the temperature at which the polymerization of the aldehyde commences, and then the mixture is brought to the temperature at which the polymerization occurs. Furthermore, the invention bears distinguishing effectivenesses and advantages, depending respectively upon two modes of the process, namely one being to obtain a suspension polymerization product by use of such inert solvent which does not dissolve the resulting polyaldehyde, and the other being to obtain a homogeneous clear polymer solution by use of such solvent which dissolves the resulting polyaldehyde.

The aldehydes to be polymerized according to the invention are aliphatic ones represented by the general formula of RCHO, wherein the R represents alkyl, cycloalkyl, alkenyl, cycloalkenyl, arylalkyl radical, halogen derivatives of these radicals or 5- or 6-membered heterocyclic radical containing oxygen in the ring, or others. Preferable aldehydes are those containing 2 to 10 carbon atoms, and more preferably 2 to 7 carbon atoms.

Typical aldehydes to be polymerized according to the invention involve acetaldehyde, propionaldehyde, n-butyraldehyde, iso-butyraldehyde, valeraldehyde, iso-valeraldehyde, hexanel, 2-ethylhexanal, heptanal, octanal, nonanal, decanal, monochloracetaldehyde, dichloracetaldehyde, hexanal, 2-ethylhexanal, heptanal, octanal, nonfluoracetaldehyde ($\alpha,\beta$), dichloropropionaldehydes($\alpha,\alpha$, $\beta,\beta,\alpha,\beta$), trichloropropionaldehydes, cyclohexylaldehyde, cyclohexylacetaldehyde, furfural, 3-cyclohexenecarboxaldehyde, 2-formyl-3,4-dihydro-2H-pyran, phenylacetaldehyde, acrolein, and the like. These may be employed separately, or as a mixture of more than one kind of them.

The organometallic compounds of metals belonging to III group, particularly IIIa group, of the Periodic Table, may generally be represented by $MR'_3$, $MR'_2X$, or $MR'X_2$, wherein the M is a metal of boron, aluminum, gallium, indium, or thallium, the R' is hydrogen atom, or alkyl, aryl, alkenyl, cycloalkyl, cycloalkenyl, alkoxy, cycloalkoxy, or aryloxy radical, or such radicals substituted by halogen, and the X is a halogen, or hydrogen atom, or a primary or secondary amine. Examples of such organometallic compounds involve aluminum trialkyl, such as aluminum trimethyl, aluminum triethyl, and aluminum tributyl; aluminum tricycloalkyl; aluminum triaryl, such as aluminum triphenyl and aluminum tri-p-tolyl; alkylaluminum halide, such as dimethylaluminum chloride, methylaluminum dichloride, dimethylaluminum bromide, methylaluminum dibromide, and diethylaluminum chloride; alkyl aluminum hydride, such as dimethylaluminum hydride, trimethyldialuminum trihydride, and di-iso-butylaluminum hydride; aluminum alkoxide, such as diethylaluminum ethoxide, ethylaluminum ethoxide, aluminum ethylate, and aluminum isopropoxide; aluminum mixed alkoxide; alkylborane, such as triethylborane and tributylborane; triphenylborane; alkylhaloborane, such as diethylchloroborane, dipropylchloroborane, and diphenylchloroborane; aryl-, alkyl-, or alkoxyborane, such as di-n-butoxyphenylborane; triethylgallium, triphenylgallium, methylgallium halides, and triphenylgallium; trimethylindium and triethylindium; and the like.

The amount of such compounds necessary for the method of the invention is within the range between about 0.01 and 10 mol percent, preferably within the range between about 0.1 and 3 mol percent, per mol of aldehyde. An amount less than 0.01 mol percent does not serve for desirable commencement of the polymerization reaction, while an amount more than 3 mol percent should not ordinarily be employed, because of the facts that the polymerization ratio reaches a maximum value at a certain concentration of the catalyst as mentioned below, that the polymerization ratio reaches saturation even when excess amount of the catalyst is employed, and that contamination of the polymer with any residual catalyst seems to accelerate deterioration of the polymer.

However, the amount for use generally varies depending upon purities of the monomer, the solvent, and the diluent employed, to a certain degree. If the purity of the solvent or the monomer employed is lower, a larger amount of the catalyst is needed, because the reactive impurities involved destroy the catalyst. It is generally preferable to decrease the amounts of carbon dioxide, oxygen, moisture, alcohol, etc. to as low level as possible.

The polymerization of the present invention is advantageously carried out in the presence of solvent or diluent to produce a polymer having an excellent quality, although it may be carried out without solvent or diluent.

Any solvent may be used in the present invention, provided that it does not damage activity of the catalyst. However, the solvent should be a liquid organic compound or a mixture thereof, which is liquid at the polymerization temperature range (−30° C. to −120° C.). The examples of such solvent, alkane, such as propane, butane, pentane, hexane, heptane, and octane; cycloalkane, such as cyclopentane, cyclohexane, methylcyclohexane, tetraline, and decaline; alkene, such as propylene, and butene; aryl such as benzene, toluene, and xylene; dialkyl-, arylcycloalkyl-, and cyclic ethers and the mixed ethers thereof, such as dimethyl ether, diethyl ether, dipropyl ether, dichloroethyl ether, ethyleneglycol dimethyl ether, dioxane, and anisol, may be mentioned. As examples of the more specific solvent, halogenated hydrocarbons and ethers, such as methyl chloride, methylene dichloride, chloroform, carbon tetrachloride, ethylene dichloride, monochlorethylene, dichlorethylene, and trichlorethylene, may be mentioned. Other examples are esters, such as ethyl acetate, ethyl butyrate, diethyl carbonate; nitriles, such as acetonitrile, and propionitrile. Of course, these solvents may be used separately or as a mixture of the plurality of them.

The polymerization of the invention is carried out at a lower temperature. Ordinarily, it is carried out at a temperature below 0° C., but above the temperature at which the aldehyde to be polymerized is solidified, preferably a temperature ranging from −20° C. to −120° C., more particularly from economical standpoint, from −20° C. to −80° C.

Interesting enough, velocity of the polymerization reaction has a negative coefficient of temperature. Thus, the lower the reaction temperature is, the larger the polymerization velocity and crystalline polymer content in the raw polymer are.

There is the upper limit of the temperature where the polymerization occurs. The upper limit somewhat varies depending upon the kind of the catalyst, solvent and aldehyde employed. It is approximately −40° C. in case of acetaldehyde. Thus, it is desirable to work the polymerization at as low temperature as possible. The reaction is generally carried out under the autogenous pressure, but a superatmospheric pressure, for example a few hundreds kg./cm.$^2$, by means of an inert gas, may be employed, if needs be.

Method of adding the catalyst will be described below, which is the most characteristic feature of the present invention. It has generally been considered heretofore that the organometallic compounds mentioned above, which is used as the catalyst in the invention, reacts with aldehyde and functions as catalyst or reactant for a low molecular reaction other than polymerization reaction. Thus, the generally accepted idea has been that an organometallic compound reacted with an aldehyde forms a Meerwein-Ponndorf type, or Grignard type complex and is converted to an alcohol or a ketone, and the organometallic compound per se is stabilized by formation of such complex and loses an active characteristic originally endowed.

The present inventor has, for the first time, added the catalyst by contacting the organometallic compound used as catalyst with the aldehyde at a lower temperature. According to the further studies, however, it comes to be presumed that the truly effective catalyst is not the organometallic compound per se as mentioned above, but an intermediate complex produced by reaction of the organometallic compound with the aldehyde as monomer.

It has been also found that such complex is readily produced nearly at room temperature, rather than at a lower temperature such as −78° C., and that such complex does not cause commencement of the polymerization at room temperature or at a temperature lower than room temperature but higher than a certain temperature, nor it does cause a lower molecular chemical reaction, such as reduction and oxygen, in the polymerization system at a temperature below a certain temperature.

For instance, acetaldehyde and aluminum triethyl immediately react nearly at room temperature with generation of ethylene and formation of a complex compound. After standing at 0° C. under nitrogen gas stream for as long as 2 days, the activity of the complex compound for polymerization remains as it was. In cases of the other organometallic compounds, similar aspects are observed. When the other aldehydes are employed, essentially similar (with slight differences, if any) results are obtained.

With the basis of the above-mentioned discovery, addition of the catalyst into the aldehyde, or addition or introduction of the aldehyde onto the catalyst, needs not be conducted at a lower temperature at which the polymerization occurs, but may be conducted at room temperature temperature or at a temperature below room temperature but above the temperature at which the polymerization commences. Thus, by uniformly mixing an aldehyde, catalyst and solvent at such temperature, ageing, if desired, the truly effective catalyst under heating or standing still, and then lowering the temperature up to that at which the polymerization occurs, the polymerization of the aldehyde is effected advantageously, and, further, effectiveness borne from use of solvent is increased.

Thus various advantages are achieved from the commercial view point, that the admixing process prior to the polymerization can be carried out nearly at room temperature (from −5° C. to +30° C.); that preservation of the polymerization mixture is possible; that weighing and analysis are easy; and that a continuous polymerization process might be possible due to the preservation as a stock solution, transportation through a pipe line, and continuous charge to a polymerization vessel, being possible.

Crystallinity of the resulting polyaldehyde considerably varies according to the method for polymerization, and use of solvent enables to increase crystallinity (this fact was disclosed in the specification of Japanese patent application 22,104/1960 by the present inventor). The addition of catalyst at room temperature further emphasizes this feature.

In other words, this invention enables to the production of highly crystalline polyethers with a higher yield. Such polyethers have many advantages in their easy handling and processing, and possess improved qualities.

Concretely speaking, if extracted fraction percent of the total polymer by methanol is regarded as measure of crystallinity of the polyaldehyde as amorphous polyaldehyde is dissolved in methanol, the methanol extractable fraction percent of the total polymer which is obtained by polymerization with aluminum triethyl without solvent, is approximately 50%. While, the methanol extractable fraction percent of the polymer which is obtained by adding aluminum trialkyl to the monomer at −78° C. in the presence of n-hexane as solvent is about 20%, but the polymer which is obtained by adding aluminum trialkyl to the monomer at 20° C. in the presence of the same solvent and then polymerizing at −78° C., according to the present invention, scarcely gives methanol extractable material, or gives methanol extractable fraction percent of as low as 10% or below. In the latter case, the polymerization yield is increased by a few fold even in a shorter period of time.

This illustrates to the fact that the effective catalyst is dispersed comparatively uniformly in the reaction mixture, especially in the monomer.

In case of using n-hexane as solvent, for instance, acetaldehyde does not mix with with it uniformly at a lower temperature, forming separated two layers. But, they form homogeneous solution at room temperature in a considerably wide range of proportion. Therefore, by adding the catalyst to such a homogeneous solution to form a truly effective catalyst (complex) which is dispersed homogeneously in the solution, and by merely cooling the mixture to cause the polymerization. excellent results as mentioned above are obtained. Besides, addition of the catalyst nearly at room temperature considerably increases the reaction velocity, compared with the addition at a lower temperature. This is believed to be due to rapid formation of the truly effective catalyst and to its uniform dispersion in the monomeric aldehyde.

For example, when the addition is effected at —78° C. in the polymerization of acetaldehyde with aluminum triethyl, about 24 hours is needed until reaching to the saturated polymerization ratio. But, in case of addition at 20° C. in the same polymerization, rapid polymerization commences as soon as the reaction mixture is cooled, and the saturated polymerization ratio is reached in ½ to 1 hour. The polymer produced in the latter case has an excellent crystallinity and stability.

Unique difference between the case of addition of the catalyst at a lower temperature and the same at room temperature is found in the relationship between the catalyst concentration and the polymerization ratio. In the low temperature addition, thus, the polymerization ratio after a definite time simply increases with increase of the catalyst concentration, being saturated at the neighbour of 2 mol percent, but in a lower degree. While, in the room temperature addition, the ratio exhibits the maximum value at a certain catalyst concentration, regardless to the sort of solvent. This maximum polymerization ratio is so high (90% to 95%) that the case of low temperature addition could not reach by all means. The concentration beyond the maximum value point decreases the polymerization ratio, and which saturates at a definite degree.

The range of catalyst concentration at which the maximum value is obtained, is somewhat narrow, and is approximately between 2% and 3% by weight based upon the amount of the monomer. This is more or less affected by purities of solvent, monomer, etc.

To conduct the polymerization nearly at such concentration is very effective when a large polymerization ratio is desired. For instance, the maximum polymerization ratio in the polymerization of acetaldehyde with aluminum triethyl at —78° C. reaches as high as about 90% during 1 hour, but the saturated value is as low as 40%. Such a large difference would yield a notable feature in economical standpoint in a commercial production.

Characteristic examples of the solvent employed in the invention is halogenated alkyl, such as methylene chloride. Acetaldehyde is miscible with methylene chloride at a lower temperature in any proportion. By polymerization in the form of such homogeneous solution by use of aluminum triethyl as catalyst, a homogeneous polymer solution is obtained, from which a film or filament is produced by evaporation. The resulting polyacetaldehyde is also crystalline and stable.

The crystallinity is varied according to the various polymerization conditions, and the polymer may, in some cases, be present as a stereoblock polymer. Contrary to the fact that polyacetaldehyde made by use of n-hexane is difficultly derived to a film or filament by means of a solvent, this process provides a very easy method for producing a film or filament.

Insofar as polymer has not so higher degree of polymerization, the halogenated alkanes play a role in solubilizing the crystalline polyacetaldehyde. Since the crystalline polymer is produced in the form of a homogeneous solution in this method, there are such advantages that a continuous solution polymerization can be conducted, and that the polymer is produced directly and continuously without such processes as separation of polymer, drying, pulverization, and even dissolution in some cases, which are in turn necessary in batch system method. There is another advantage that the resulting polymer solution can be directly processed to a shaped article, such as film and filament.

In addition to chlorinated alkanes, such as chloroform, methylene chloride, and carbon tetrachloride, toluene, xylene and dichlorethyl, ether are mentioned as examples of such solvent.

Copolymers of the aldehydes may be obtained in the similar way when a mixture of more than one kind of the aldehydes is polymerized. This method is effective in modification of the physical properties. For example, the polyether is given specific properties by use of a halogenated aliphatic aldehyde as comonomer.

The present invention will more fully be described with reference to the following examples, but they are not given for the purpose of limitation. Obviously, various modification may be made without deviation from the spirit of the invention.

*Example 1*

In a vessel cooled at —78° C. by means of acetone-Dry Ice bath and flashed with nitrogen stream, 50 ml. of n-hexane and 5 g. of acetaldehyde are placed. Under vigorous stirring, 0.5 cc. of a 30% solution of aluminum triethyl in n-hexane is added thereto. By continuation of the stirring, a solid product comes to form after about 1 hour. After 8 hours of total period, methanol is added to cease the polymerization. The suspended solid material is separated, washed and dried in vacuo to yield 2.3 g. of a white, granular polymeric material, which is found to be crystalline by X-ray analysis, and to be polyether type higher molecular product by infrared spectrum. The spacings (A.) are as follows.

7.3 (strong),   5.2 (medium),   3.9 (strong),
3.29 (medium), 2.88 (medium),  2.54 (very weak),
2.33 (weak),   2.16 (very weak), 2.04 (weak).

The product is insoluble in ether, alkane, alcohol, acetone, and benzene, and swells by chloroform.

*Example 2*

Paraldehyde, dried by standing on molecular sieve and then separated from an acidic substance by contacting with calcium carbonate, is added with a small amount of p-toluene sulfonic acid and heat-decomposed to yield acetaldehyde. Ten parts of the resulting acetaldehyde and 20 parts of fully dehydrated, dry n-hexane are mixed at room temperature in a vessel flashed with nitrogen stream, to make a homogeneous solution. Two weight percent of aluminum triethyl, based on weight of acetaldehyde, is added thereto, and the mixture is well mixed by stirring. After 5 minutes, the vessel is cooled at —78° C. by immersion into a Dry Ice-acetone bath, and allowed to stand for 24 hours. The vessel is opened, and a small amount of methanol is added under stirring therein. The solid material is separated and well washed with n-hexane, followed by drying in vacuo. Six and a fifth parts of white powdered polymer is obtained, which proved to be highly crystalline by X-ray analysis. No part of the polymer is soluble in methanol and chloroform.

A case wherein all procedure is carried out at —78° C. and otherwise the same recipe as above, gives polymer yield of 2.2 parts, which contains about 20% of methanol extractable portion.

*Example 3*

Paraldehyde, stood overnight on calcium carbonate, separated therefrom, and then dried by standing on molecular sieve, is distilled in vacuo, and decomposed by heating on a water-bath in the presence of a small amount of p-toluenesulfonic acid, to make acetaldehyde. In a vessel flashed with nitrogen stream, 0.23 mol of the resulting acetaldehyde (after redistillation) and 30 cc. of well dehydrated, dry n-hexane are mixed, and 0.00175 mol of aluminum triethyl is added thereto. A large amount of ethylene generates. The mixture is stirred well and the vessel is closed. Three minutes later, the mixture is cooled at −78° C. in a Dry Ice-acetone bath, and allowed to stand for 8 hours as such. After opening of the vessel, the product is well washed with n-hexane, separated, and dried in vacuo. White, powdered, crystalline polyacetaldehyde is obtained in about 70% yield.

The same procedures as above, except that amounts of the catalyst added are 0.0044 mol and 0.001 mol, give about 35.5% and about 19.2%, respectively, of polymer yields.

*Example 4*

In a vessel flashed with nitrogen stream, 0.2 g. of aluminum isopropylate is dispersed under heating in 30 cc. of n-hexanol. After being allowed to cool to room temperature, 10 g. of acetaldehyde is added thereto. The vessel is closed and immersed into a bath at −78° C. Eight hours after the standing, 5.2 g. of dry polymeric material is obtained.

The same procedure as above, except that amount of catalyst used is 0.7 g., gives the polymer yield of 3.7 g.

*Example 5*

In a vessel flashed with nitrogen stream, 10 g. of well dried trichloracetaldehyde and 30 g. of n-hexane are mixed at room temperature (22° C.), and 0.002 mol of aluminum triethyl is added thereto. The vessel is closed and stood in a bath at −80° C. for 8 hours. The produce is fully washed with n-hexane and methanol, and dried. A crystalline polymer is yielded, weighing 7.2 g.

While, additions of 0.01 mol, and 0.001 mol of aluminum triethyl with otherwise the same conditions, give 3.8 g. and about 2 g., respectively, of polymers.

*Example 6*

In a vessel flashed with nitrogen stream, 12 g. of dry propionaldehyde and 50 cc. of n-hexane are mixed at room temperature (22° C.), and then 0.002 mol of aluminum triethyl is added thereto. The vessel is closed and stood in a bath at −78° C. for 8 hours. After opening the vessel, the product is well washed with n-hexane and methanol, and dried in vacuo, to obtain about 8.4 g. of white, powdered polymer.

The procedures carried out under the same conditions as above, by use of 0.001 mol and 0.003 mol of aluminum triethyl, give 3.7 g. and 6.5 g., respectively, of polymer yields.

*Example 7*

In a vessel flashed with nitrogen stream, 15 g. of dry monochloracetaldehyde and 50 cc. of n-hexane are mixed at room temperature (22° C.), and then 0.002 mol of aluminum triethyl is added thereto. The vessel is closed and stood in a bath at −78° C. for 8 hours. After opening the vessel, the product is well washed with n-hexane and methanol, and dried in vacuo, to obtain about 10 g. of white, powdered polymer.

The procedures carried out under the same conditions as above, by use of 0.001 mol and 0.005 mol of aluminum triethyl, give 4.0 g. of 7.8 g., respectively, of polymer yields.

*Example 8*

To a mixture of 50 cc. of methylene chloride and 10 g. of acetaldehyde, placed in a vessel flashed with nitrogen stream, 2% by weight, based on the aldehyde, of aluminum triethyl is added. The vessel is closed and stood in a bath at −78° C. One hour later, the polymerization system turns to a viscous, clear, homogeneous solution. Upon pouring the solution into n-hexane, a fibrous material is produced. After washing and drying, 7 g. of crystalline polyaldehyde is obtained.

If the solution is flown onto a glass plate, rather than pouring into n-hexane, to remove the unreacted monomer and the solvent, a semi-transparent film is obtained.

*Example 9*

To a mixture of 50 cc. of methylene chloride and 10 g. of acetaldehyde, placed in a vessel flashed with nitrogen stream, 2% by weight, based on the aldehyde, of aluminum triethyl is added. The vessel is closed and shaken for 1 hour in a bath at −78° C. The polymerization is almost completed in a half hour. After 1 hour, the vessel is opened, and the content is flowed onto a heated glass plate to form a film and sheet. The polymer is crystalline and yielded in an amount of about 7.2 g.

*Example 10*

In a vessel flashed with nitrogen stream, 30 ml. of toluene and 15 g. of acetaldehyde are mixed at 22° C., and 2%, based on the aldehyde, of aluminum triethyl is added thereto. After 10 minutes, the mixture is cooled at −80° C. and stood as such for 24 hours. The polymerization system turns to a colorless, homogeneous, viscous solution, which is poured into anhydrous n-hexane. The separated precipitate is collected and washed with methanol, to yield 4.5 g. of solid, white, powdered polymer, which is proved to be crystalline polyacetaldehyde by X-ray diagram.

*Example 11*

In a vessel flashed with nitrogen stream, 40 ml. of n-hexane and 10 g. of well dried trichloracetaldehyde are placed. To this mixture, 1.0 cc. of a 30% solution of aluminum triethyl in hexane is added under vigorous stirring. By cooling to −100° C. and continuously stirring, a solid product comes to form after about 1 hour. After 20 hours, a small amount of methanol is added to cease the polymerization. The product is filtered, washed and dried in vacuo, to yield 6.7 g. of polymeric material. This is proved to be poly-trichloracetaldehyde, on the basis of high crystallinity known from the findings on infrared spectrum and powdered X-ray photogram. The spacings (A.) are as follows: 8.70 (strong), 5.0 (strong), 3.29 (medium), 3.73 (medium), 2.41 (weak).

*Example 12*

In a vessel flashed with nitrogen stream, 50 ml. of n-hexane and 15 g. of propionaldehyde are mixed at room temperature, and 2.0 cc. of a 30% solution of aluminum triethyl in hexane is added thereto. The reaction mixture is polymerized during stirring in a Dry Ice-acetone bath at −78° C. for 20 hours. The mixture is added with a small amount of methanol, and filtered. By washing and stirring, 7.3 g. of a crystalline, white, powdered polymer is obtained.

*Example 13*

In a vessel flashed with nitrogen stream, 30 ml. of n-heptane and 10 g. of well dried cyclohexyaldehyde are mixed at room temperature under stirring, and 2%, based on the aldehyde, of aluminum triethyl is added thereto. The mixture is cooled at −78° C. and stood as such for 24 hours. The reaction mixture is added with a small amount of methanol and filtered. After washing and drying in vacuo, 4 g. of polymeric material is obtained.

*Example 14*

In a vessel flashed with nitrogen stream, 30 ml. of n-hexane and 10 g. of well dried monochloracetaldehyde are mixed at room temperature, and 2%, based on the aldehyde, of diethylaluminum chloride is added thereto. The mixture is cooled at −80° C. and stood as such for 24 hours under stirring for polymerization. Then, a small amount of methanol is added, and 8.2 g. of a solid product is separated, which is then dried in vacuo. The resulting white powdered product is proved to be a crystalline polymer from infrared spectrum and X-ray diagram.

*Example 15*

In a vessel flashed with nitrogen stream, 20 parts of cyclohexane, 20 parts of decaline, and 10 parts of acetaldehyde are mixed at room temperature, and 0.2 part of aluminum triethyl is added thereto. The mixture is cooled in a bath at −78° C. and stirred continuously. After 24 hours, a small amount of methanol is added thereto. The solid product separated is well washed with cyclohexane and dried, yielding 4.7 parts of white, crystalline polymer.

*Example 16*

In a vessel flashed with nitrogen stream, 50 parts of n-pentane and 10 parts of well dried trichloropropionaldehyde are mixed under stirring at −10° C. The mixture is cooled at −78° C., followed by addition of 0.2 part of aluminum triethyl, while the stirring is continued. After 24 hours, a small amount of methanol is added to the system. The product separated is washed and dried, yielding 4.1 g. of white, crystalline polymer.

*Example 17*

In a vessel flashed with nitrogen stream, 50 parts of methylene chloride and 0.5 part of aluminum isopropylate are mixed, and 10 parts of acetaldehyde is added under stirring thereto. The mixture is cooled at −78° C. and shaked for 10 hours. The polymerization system turns to a homogeneous, clear, viscous solution, which is then poured into n-hexane to yield a solid powdered polymer. While, a film is made by evaporation of the viscous solution.

*Example 18*

In a vessel flashed with nitrogen stream, a mixture of 50 parts of well dried β,β′-dichlorodiethyl ether, 50 parts of methylene chloride, and 20 parts of acetaldehyde is added with 0.5 part of aluminum triethyl, and then polymerized in a bath at −78° C. under shaking for 3 hours. The polymerization system turns to a clear, homogeneous solution, which forms a film material upon flowing onto a hot plate.

*Example 19*

In a vessel flashed with nitrogen stream, a mixture of 50 parts of n-hexane, 10 parts of acetaldehyde, and 10 parts of trichloracetaldehyde is mixed with 0.4 part of aluminum triethyl at room temperature, and stood in a bath at −78° C. for 10 hours. The product is separated by addition of n-hexane, yielding 12.6 parts of stable, solid, white polymer.

*Example 20*

In a vessel flashed with nitrogen stream, a mixture of 50 parts of diethyl ether, 10 parts of acetaldehyde, and 10 parts of propionaldehyde is mixed with 0.4 part of aluminum triethyl at room temperature, and stood in a bath at −78° C. for 16 hours. The product weights 9.7 parts, which is a stable, white, solid polymer.

*Example 21*

The results obtained from polymerization systems, with the same procedures as in Example 3, but using various kinds solvent, are set forth below.

In all cases, colorless polymers containing a crystalline part are obtained.

*Example 22*

In a vessel flashed with nitrogen stream, 20 ml. of n-hexane, 0.5 g. of triethylboron, and 10 g. of acetaldehyde are mixed at room temperature. The vessel is closed and stood in a bath at −78° C. for 15 hours. After the vessel is opened, 50 ml. of n-hexane is added therein. The product is separated, washed, and dried in vacuo, which weighs 1.7 g. and is a white polymer containing a crystalline part.

I claim:

1. A method for producing crystalline polyether type polyaldehydes which comprises premixing a monoaldehyde of 2 to 10 carbon atoms and of the general formula RCHO, wherein R is a member selected from the group consisting of alkyl, cycloalkyl and halogen substituted alkyl, with a catalyst selected from the group consisting of $MR'_3$ and $MR'_2X$, wherein R′ is a member selected from the group consisting of lower alkyl and lower alkoxy, M is a member selected from the group consisting of aluminum and boron, and X is halogen in a solvent medium at a temperature between room temperature and the polymerization temperature and thereafter lowering the temperature to a temperature of −20° C. to −120° C. to initiate polymerization.

2. A method according to claim 1, wherein the amount of the organometallic compound is within the range from 0.01 mol percent to 3.0 mol percent based on the aldehyde monomer.

3. A method according to claim 1, wherein the solvent medium is a member selected from the group consisting of aliphatic hydrocarbons, cycloaliphatic hydrocarbons, aromatic hydrocarbons, halogen-substituted hydrocarbons, ethers, esters and nitriles, said medium being liquid at the temperature of polymerization.

4. A method according to claim 1 wherein the catalyst is $MR'_3$ and M and R′ have the same significance as set forth in claim 1.

5. A method according to claim 4 wherein the amount of catalyst is within the range of 0.01 mol percent to 3.0 mol percent based on the aldehyde monomer.

6. A method according to claim 4 wherein the solvent medium is a member selected from the group consisting of aliphatic hydrocarbons, cycloaliphatic hydrocarbons, aromatic hydrocarbons, halogen-substituted hydrocarbons, ethers, esters and nitriles, said medium being liquid at the temperature of polymerization.

7. A method according to claim 1 wherein the catalyst is $MR'_2X$ and M, R′ and X have the same significance as set forth in claim 1.

8. A method according to claim 7 wherein the amount of the organo-metallic compound is within the range from 0.01 mol percent to 3.0 mol percent based on the aldehyde monomer.

9. A method according to claim 7 wherein the solvent medium is a member selected from the group consisting of aliphatic hydrocarbons, cycloaliphatic hydrocarbons, aromatic hydrocarbons, halogen-substituted hydrocarbons, ethers, esters and nitriles, said medium being liquid at the temperature of polymerization.

10. A method for producing crystalline polyether type copolyaldehydes which comprises premixing a mixture of

| No. | Aldehyde (parts) | Solvent (parts) | Catalyst (parts) | Polymer (parts) |
|---|---|---|---|---|
| 1 | Acetaldehyde (10) | Acetonitrile (20) | Al(Et)$_3$ (0.5) | 1.9 |
| 2 | ----do---- | Ethyl acetate (20) | Al(Et)$_3$ (0.5) | 3.6 |
| 3 | ----do---- | Diethyl carbonate (20) | Al(Et)$_3$ (0.5) | 2.8 |
| 4 | ----do---- | Chloroform (10), methylene chloride (10). | Al(Et)$_3$ (0.5) | 2.1 |
| 5 | ----do---- | Dichlorethyl ether (10) | Al(Et)$_3$ (0.5) | 2.5 | two monoaldehydes of 2 to 10 carbon atoms and of the general formulae RCHO and R″ CHO, respectively, wherein R and R″ are different and represent members selected from the group consisting of alkyl, cycloalkyl and halogen-substituted alkyl, with a catalyst selected from the group consisting of $MR'_3$ and $MR'_2X$, wherein R' is a member selected from the group consisting of lower alkyl and lower alkoxy; M is a member selected from the group consisting of aluminum and boron; and X is halogen in a solvent medium at a temperature between room temperature and the polymerization temperature and thereafter lowering the temperature to a temperature of —20° C. to —120° C. to initiate polymerization.

References Cited by the Examiner

UNITED STATES PATENTS

| | | | |
|---|---|---|---|
| 2,084,213 | 6/1937 | Osterhof | 260—67 |
| 2,274,749 | 3/1942 | Smyers | 260—67 |
| 2,848,437 | 8/1958 | Langsdorf et al. | 260—67 |
| 3,001,966 | 9/1961 | Funck et al. | 260—67 |
| 3,183,210 | 5/1965 | Furukawa et al. | 260—67 |

OTHER REFERENCES

Chem. Abstracts, Vol. 46, pp. 6586–6587.

Villani et al., Journ. Amer. Chem. Soc., Vol. 69 (August–December 1947), pp. 2605–2607 relied on.

Bevington, Quarterly Reviews (London), Vol. 6, No. 2 (1952), pp. 141–156.

Meerwein et al., Journ. fur Prak. Chemie, N. F. Bd. 147 (1936), pp. 207–208 relied on.

Furukawa et al., Die Makromoleculare Chemie, Vol. 37 (April 1960), pp. 149–152. QP281. P6 M2.

Natta et al., ibid., pp. 156–159.

Furukawa et al., ibid., Vol. 44 (March 1961), pp. 398–407.

Derwent Belgian Patents Report, No. 75A (May 1961), pp. A. 7–8. For. Pat. Jor.

SAMUEL H. BLECH, *Primary Examiner.*

MILTON STERMAN, LOUISE P. QUAST, WILLIAM H. SHORT, *Examiners.*

R. J. BUTTERMARK, L. M. MILLER,
                      *Assistant Examiners.*